United States Patent [19]

Long et al.

[11] Patent Number: 4,592,424

[45] Date of Patent: Jun. 3, 1986

[54] SECONDARY RECOVERY PROCEDURE

[75] Inventors: Stephen L. Long; Alfred Brown, both of Houston, Tex.

[73] Assignee: Texaco Inc., White Plains, N.Y.

[21] Appl. No.: 639,657

[22] Filed: Aug. 13, 1984

[51] Int. Cl.$^4$ ........................ E21B 43/22; E21B 43/24
[52] U.S. Cl. ................................ 166/263; 166/272; 166/304; 166/305.1
[58] Field of Search ............... 166/263, 268, 272, 303, 166/304, 305 R, 305.1

[56] References Cited

U.S. PATENT DOCUMENTS

| | | | |
|---|---|---|---|
| 3,252,512 | 5/1966 | Baker et al. | 166/263 |
| 3,354,954 | 11/1967 | Buxton | 166/263 X |
| 3,402,770 | 9/1968 | Messenger | 166/272 X |
| 3,437,146 | 4/1969 | Everhart et al. | 166/304 X |
| 3,729,053 | 4/1973 | Froning | 166/304 |
| 3,995,693 | 12/1976 | Cornelius | 166/263 X |
| 3,998,743 | 12/1976 | Maly et al. | 166/304 X |
| 4,071,458 | 1/1978 | Allen | 166/272 X |
| 4,109,720 | 8/1978 | Allen et al. | 166/272 X |
| 4,465,136 | 8/1984 | Troutman | 166/263 |
| 4,484,630 | 11/1984 | Chung | 166/263 |

FOREIGN PATENT DOCUMENTS 575830  5/1959  Canada ........................... 166/305 R Primary Examiner—George A. Suchfield
Attorney, Agent, or Firm—Robert A. Kulason; James J. O'Loughlin

[57] ABSTRACT

A method applicable to secondary recovery procedure employing an injection well. It applies to conditions caused by return flow of injection fluid back into the well from the formation being injected. It frees the well and injected formation from heavy paraffinic-aromatic residue that is carried by the return flow.

16 Claims, No Drawings

SECONDARY RECOVERY PROCEDURE

BACKGROUND OF THE INVENTION

This invention concerns secondary recovery in petroleum producing, in general. More specifically, it relates to a method that applies to secondary recovery where an injection well is employed and wherein the fluid injected into the formation withdraws back into the injection well. Such conditions have been found to cause a heavy residue that fills the pores of the surrounding formation and any gravel pack that is being used. Furthermore, while the application of steam could easily dissolve normally occurring deposits of mere paraffin, the heavy residue has been discovered to be intractable to such treatment. However, a method according to this invention frees the foregoing heavy residue from the porous formation, so that an injection procedure may proceed unimpeded.

SUMMARY OF THE INVENTION

Briefly, the invention is in a secondary recovery procedure employing an injection well, wherein fluid is injected and the said injection has stopped long enough to cause back flow from the formation back into the well. It concerns a method of freeing said formation adjacent to said well from heavy paraffinic-aromatic residue. It comprises the steps of introducing a quantity of solvent for said residue into said well at said formation, and holding said quantity of solvent at said formation for a pre-determined length of time. It also comprises introducing another quantity of said solvent into said well, and immediately beginning injection of said injection well fluid as prior to said back flow.

Once more briefly, the invention is in a secondary recovery procedure employing an injection well, wherein steam is injected and said injection has stopped long enough to cause backflow from the formation into said well of a heavy paraffinic-aromatic residue comprising hydrocarbons of C-38 and higher. It concerns a method of freeing said formation adjacent to said well from said residue. The method comprises introducing a slug of aromatic solvent of about five hundred to six hundred gallons into said well at said formation, and holding said slug of solvent at said formation for about twenty to thirty minutes. It also comprises introducing another slug of said aromatic solvent of about five hundred to six hundred gallons into said well, and immediately recommencing said steam injection to continue said secondary recovery, following the freeing of said formation.

DETAILED DESCRIPTION

A well known type of secondary recovery in oil field procedures involves steam injection which is applied to one or more injection wells so as to inject steam into the formation containing hydrocarbon product. Such procedure acts to provide what is called a steam flood that loosens and drives recoverable hydrocarbons from the formation to one or more producing wells located nearby. In such steam flooding operations the quality of the steam that is being injected into the formation is of interest and one of the procedures employed in regard to steam quality has involved a tool known as a down hole steam quality sampler.

It was discovered during the use of such a tool that difficulty with the operation of the tool was encountered. The difficulty occurred in a situation where a steam flood had been interrupted because the steam generator at the surface failed to continue a supply of steam to the formation. Such condition lasted long enough to cause a collapse of the steam chest which surrounded the injection well, in the formation of interest. Consequently, the fluids which accompanied the injected steam, returned, or flowed back into the injection well. And, it was discovered that such back flow of fluids from the formation carried a heavy paraffinic-aromatic residue back into the well. It was this residue that caused the discovered mechanical difficulties with the sampler tool. Furthermore, it was discovered that the foregoing residue also clogged the gravel pack and/or the pores of the formation being injected, so that attempts to restart an injection procedure or steam flood, were met by a large resistance, resulting in high pressure injection.

The foregoing heavy organic residue material was found to consist mainly of very heavy paraffins and aromatics, i.e., those with carbon chains exceeding C-38. Materials of that nature are often such as to have exceedingly high melting and boiling point temperatures, so that recommencing of steam injection was not effective in moving those residues in order to have the steam flood procedure continue effectively.

In order to overcome the difficulties created by the aforementioned heavy organic residue, a method has been developed which acts to dissolve the objectionable residue from the formation followed by resumming the injection of injection fluid, e.g., the steam which was employed in a steam flood secondary recovery operation. The method makes use of a solvent wash applied to the formation such that the heavy residue is dissolved and carried away in order to free the formation for application of an injection fluid as originally used.

When a procedure according to this invention is applied, the results may be determined by applying an injection at the usual rate and measuring the pressure at the well. When the treatment has been successful a decrease in the injection pressure will be observed. However, it is to be expected that while a solvent treatment volume of about one thousand to twelve hundred gallons should be sufficient, if a pressure decrease is not observed it might be required to increase the solvent treatment volume employed.

It may be noted that while the use of a solvent wash to dissolve a paraffin type deposit has been employed heretofore, the paraffin build-up being removed has related to producing wells. Consequently, the occurrence of a heavy paraffinic-aromatic residue has not been involved. Thus, an aspect of this invention is the fact that while common paraffin deposits may be dissolved by steam temperatures and pressures such as are normally employed in steam flooding operations, heavy residue deposits, e.g., paraffinic-aromatic material that has carbon chains exceeding C38 are not effected by the temperatures and pressures of the steam. Consequently, use of a procedure according to this invention is required to remove such deposits of residue.

It has been discovered that in situations such as with steam flooding in which the steam applied to an injection well has been cut-off for a considerable length of time, the area of the formation where steam had penetrated will be subject to reverse flow as the steam chest collapses. Thus the lighter petroleum products which were being driven through the formation for production at wells situated near the injection well, will tend to flow back into the injection well. When that happens the reverse flow of such lighter petroleum products carries with it a heavy paraffinic-aromatic residue. It is such residue that returns into the injection well and at the same time coats the gravel and the formation pores at the well. This movement with concentration of such residue creates the problems which are involved and need to be overcome in accordance with the invention.

It was discovered that the residue of concern would not have been deposited on the well bore tubing or the gravel pack and the formation surrounding the well, if the steam generator had not stopped functioning for substantial time periods during the life of a steam flood. Therefore, it is believed that the heavy residual materials are left behind the steam flood front in the formation as it penetrates out around an injection well. Consequently, it is only when a reverse flow is encountered that these heavy residual materials are moved back toward the well where they coat the formation pores and the gravel pack, as well as entering the well bore itself.

In some secondary recovery procedures carbon dioxide is used as a drive fluid. In such case, when a so called push-pull procedure is employed, it is subject to the same difficulty as was encountered in a steam flood situation indicated above. Consequently, this invention is also applicable to a carbon dioxide push-pull secondary recovery procedure.

EXAMPLE

During a steam flood secondary recovery operation, the steam generator failed a number of times during the early life of the operation. Thereafter as a downhole steam quality sampler tool was run in the hole it malfunctioned and was unable to obtain meaningfull samples. The malfunction was attributed in substantial part to a coating of sticky, paraffinic-aromatic residue which was subjected to both a type analysis and a laboratory gas chromatograph analysis with the results shown in the following tables:

TABLE I

TYPE ANALYSIS OF A PARAFFINIC RESIDUE FROM WELL 158, HUMBLE FIELD, HARRIS COUNTY, TEXAS

| Hydrocarbon Type | Weight Percent |
| --- | --- |
| Paraffin-Naphthene | 53.44 |
| Aromatic | 40.71 |
| Resin | 1.02 |
| Asphaltene | 4.83 |
|  | 100.00 |

TABLE II

GAS CHROMATOGRAPHIC ANALYSIS OF THE LIGHTER COMPONENT FRACTION (30 MOLE %) OF THE PARAFFINIC RESIDUE FROM WELL 158, HUMBLE FIELD, HARRIS COUNTY, TEXAS

| HYDROCARBON | MOLE PERCENT |
| --- | --- |
| C-15 | 0.8574 |
| C-16 | 1.0853 |
| C-17 | 0.7315 |
| Pristane | 0.6895 |
| C-18 | 1.3371 |
| Phytane | 1.3551 |
| C-19 | 2.6142 |
| C-20 | 3.2798 |
| C-21 | 3.6875 |
| C-22 | 5.1805 |
| C-23 | 5.2045 |
| C-24 | 4.9466 |
| C-25 | 6.6735 |

TABLE II-continued

GAS CHROMATOGRAPHIC ANALYSIS OF THE LIGHTER COMPONENT FRACTION (30 MOLE %) OF THE PARAFFINIC RESIDUE FROM WELL 158, HUMBLE FIELD, HARRIS COUNTY, TEXAS

| HYDROCARBON | MOLE PERCENT |
| --- | --- |
| C-26 | 5.9779 |
| C-27 | 5.3484 |
| C-28 | 5.5762 |
| C-29 | 4.7967 |
| C-30 | 5.0726 |
| C-31 | 5.7021 |
| C-32 | 4.8987 |
| C-33 | 6.4276 |
| C-34 | 5.5522 |
| C-35 | 7.2611 |
| C-36 | 5.7441 |
|  | 100.000 |

The type analysis showed that the organic residue consisted mainly of very heavy paraffins and aromatics. The laboratory gas chromatograph analyses showed the composition of the paraffins up to C-36 which was approximately 30 mole percent of the organic residue. The remainder of the residue was in the C-38 plus range.

An example of carrying out the procedure according to the invention, includes the following steps. In an injection well having a depth of 3500 feet, an initial slug of about 500 to 600 gallons of solvent is slowly injected. The solvent employed is an aromatic solvent, e.g., xylene or toluene, and it may be diluted with kerosene. The initial slug is allowed to sit for about 20–30 minutes. Then another slug of about the same quantity of the same solvent is injected. The second slug is followed immediately by steam injection at the same rate as was being employed in the injection prior to the invention procedure.

An indication of success in removing the undesirable residue from blocking the formation, is a decrease in the injection pressure. It will be understood that if no decrease in pressure response results, the total volume of the two slugs should be increased.

It may be noted that in the foregoing example, the steam and the final slug of solvent are at about five hundred-forty degrees Fahrenheit and nine hundred-sixty pounds per square inch. Thus, the undesirable residue materials are dissolved. Whereas, the mere application of steam at the same temperature and pressure would be ineffective.

Solvent Selection and Requirements

The type of solvent selected depends upon (1) composition of the residue and (2) pressure and temperature of the wellbore. For a heavy paraffinic and aromatic residue, such as in the foregoing example, it can be dissolved by a highly aromatic solvent. One skilled in the art given a residue sample could determine the solubility in a variety of solvents. However, for the solvent to be effective, it should largely stay in the liquid phase. The phase state of the solvent will be a function of the pressure and temperature in the wellbore.

Given the wellhead pressure, it is safe to assume that the well is at the steam temperature corresponding to that pressure. For a pure substance, such as toluene or xylene, it is easy to determine the phase state; one simply needs to determine the vapore pressure of the solvent at the wellhead pressure. If the vapor pressure is greater than the wellhead pressure, (at saturation temperature) then the solvent will be vaporized. If the vapor pressure is less than the wellhead pressure, the solvent will be a liquid. Mixing the pure solvent with kerosine or another hydrocarbon diluent will not change this. The xylene will vaporize leaving the diluent.

A multicomponent solvent will act in a similar manner as the diluted xylene. The components with a vapor pressure greater than the wellhead pressure will vaporize, leaving the other components. This of course will change the composition of the liquid phase. Ideally, this will not significantly change the solubility of the liquid phase.

To pick a proper multicomponent solvent one should refer to a vapor pressure vs. temperature curve (not shown). Solvents with a higher vapor pressure curve than water, such as debutanized light straight run gasoline, will be vaporized. Solvents with lower vapor pressure curves, will be largely in the liquid phase. Also, it may be noted that the pure solvent benzene crosses the water curve at approximately 360° F. Consequently, at lower steam temperatures it would not be as effective as it would be at steam temperatures greater than 360° F.

Therefore, it is very important in carrying out this invention to consider both solubility and the phase behavior of the solvent. However, it may be noted that in connection with a $CO_2$ push-pull procedure the phase behavior is not as important because the wellbore will usually be at must lower temperature (approximately reservoir conditions). Consequently the selected solvent would normally be in a liquid state.

While preferred embodiments of the method according to this invention have been described above in considerable detail, this is not to be taken as in any way limiting the invention but merely as being descriptive thereof.

We claim:

1. In a secondary recovery procedure employing an injection well wherein fluid is injected and said injection has stopped long enough to cause back flow from the formation back into the well, a method of freeing said formation adjacent to said well from heavy paraffinic-aromatic residue, comprising the steps of
   introducing a quantity of solvent for said residue into said well at said formation,
   holding said quantity of solvent at said formation for a predetermined length of time,
   introducing another quantity of said solvent into said well, and
   immediately beginning injection of said injection well fluid as prior to said back flow.

2. In a secondary recovery procedure according to claim 1, wherein
   said injection well fluid is steam.

3. In a secondary recovery procedure according to claim 2, wherein
   said heavy residue comprises hydrocarbons of C-38 and higher.

4. In a secondary recovery procedure according to claim 2, wherein
   said quantity of solvent is a slug.

5. In a secondary recovery procedure according to claim 4, wherein
   said heavy residue comprises hydrocarbons of C-38 and higher.

6. In a secondary recovery procedure according to claim 4, wherein
   said predetermined length of time is about twenty to thirty minutes.

7. In a secondary recovery procedure according to claim 6, wherein
   said heavy residue comprises hydrocarbons of C-38 and higher.

8. In a secondary recovery procedure according to claim 6, wherein
   said solvent is an aromatic solvent.

9. In a secondary recovery procedure according to claim 8, wherein
   said heavy residue comprises hydrocarbons of C-38 and higher.

10. In a secondary recovery procedure according to claim 8, wherein
    said slug is about five hundred to six hundred gallons.

11. In a secondary recovery procedure according to claim 10, wherein
    said heavy residue comprises hydrocarbons of C-38 and higher.

12. In a secondary recovery procedure according to claim 1, wherein
    said injection well fluid is carbon dioxide.

13. In a secondary recovery procedure according to claim 12, wherein said heavy residue comprises hydrocarbons of C-38 and higher.

14. In a secondary recovery procedure according to claim 1, wherein
    said heavy residue comprises hydrocarbons of C-38 and higher.

15. In a secondary recovery procedure employing an injection well wherein steam is injected and said injection has stopped long enough to cause back flow from the formation into said well of a heavy paraffinic-aromatic residue comprising hydrocarbons of C-38 and higher, a method of freeing said formation adjacent to said well from said residue, comprising
    introducing a slug of aromatic solvent of about five hundred to six hundred gallons into said well at said formation,
    holding said slug of solvent at said formation for about twenty to thirty minutes,
    introducing another slug of said aromatic solvent of about five hundred to six hundred gallons into said well, and
    immediately recommencing said steam injection to continue said secondary recovery following the freeing of said formation.

16. In a secondary recovery procedure employing an injection well wherein carbon dioxide is injected and withdrawn alternately causing back flow from the formation into said well of a heavy paraffinic-aromatic residue comprising hydrocarbons of C-38 and higher, a method of freeing said formation adjacent to said well from said residue, comprising
    introducing a slug of aromatic solvent of about five hundred to six hundred gallons into said well at said formation,
    holding said slug of solvent at said formation for about twenty to thirty minutes,
    introducing another slug of said aromatic solvent of about five hundred to six hundred gallons into said well, and
    immediately recommencing said alternate injection and withdrawal of carbon dioxide.

* * * * *